Patented Oct. 31, 1944

2,361,900

UNITED STATES PATENT OFFICE 2,361,900

METHOD OF MOLDING

Robert D. Lowry and Robert C. Reinhardt, Midland, Mich., assignors to The Dow Chemical Company, Midland, Mich., a corporation of Michigan No Drawing. Application October 13, 1941, Serial No. 414,790

1 Claim. (Cl. 18—55)

This invention relates to a method of fabricating certain crystalline polymers and, more particularly, to a method of producing an injection molded article of substantially permanent predetermined dimensions.

By the term "crystalline polymer," as used in the present specification and claim, is meant those solid products, whether polymers, co-polymers, inter-polymers, or otherwise named which normally exhibit characteristic x-ray diffraction patterns and which may be obtained by polymerizing, separately or in combination, substances containing an ethylenic double bond such, for example, as monomeric vinylidene chloride or ethylene, and, by polymerizing together monomeric vinylidene chloride, ethylene or other similar monomers in major proportion with one or more other polymerizable materials such as vinyl chloride, vinyl acetate, styrene, the esters of acrylic or methacrylic acid, allyl and related esters of carboxylic or inorganic acids, unsaturated ethers, etc.

By the term "fused mass," as used in the present specification and claim, is meant a normally crystalline polymeric mass from which substantially all crystallinity has disappeared, as evidenced by the disappearance of its characteristic X-ray diffraction pattern. This condition is produced by heating the polymer to a temperature slightly above its crystalline melting point.

Polymerized vinylidene chloride can be deformed plastically at ordinary molding temperatures, e. g., 150°–170° C., only by the use of very high pressures and then only to produce simple forms where little plastic flow is required. United States Letters Patent 2,183,602 discloses that vinylidene chloride and co-polymers thereof can be readily molded under moderate pressures if they are subjected to a treatment which comprises completely fusing the normally crystalline polymer by heating it to a temperature above its crystalline melting point and then cooling or chilling the fused mass in such manner as to bring it to a temperature below its crystalline melting point without substantial recrystallization. This produces a supercooled form of the polymer which is easily deformable and can be cold-worked readily. However, articles made by injection molding the supercooled mass so produced may flow and change dimension unless held in their final shape for considerable periods of time.

We have now discovered a procedure by which injection molded articles can be manufactured from normally crystalline polymers in which the disadvantage of temporarily impermanent shape is overcome. Our procedure comprises fusing the crystalline polymer and injecting the fused mass directly into a die maintained at a temperature in the range between about 50° C. and about 110° C. By operating in this manner the fused polymer is recrystallized and "set" in a period of time varying from two or three seconds to thirty seconds or more, depending upon the particular polymer used and the size and shape of the article being fabricated. The preferable range in which the die is to be maintained for the injection molding of normally crystalline vinylidene chloride polymers is between about 70° C. and about 95° C.

As a specific embodiment of the new practice, a crystalline polymer prepared by polymerizing together a mixture composed essentially of 80% of monomeric vinylidene chloride, 20% of monomeric vinyl chloride and containing 7% di-(alpha-phenyl-ethyl) ether as a plasticizer was heated to a temperature of 190° C. in the chamber of an injection molding machine. The fused mass was expressed through the sprue and into the heated matrix or molding chamber held at a temperature of approximately 70° C. The resulting form, when removed from the molding chamber, was found to be hard and tough, and to exhibit crystalline characteristics as shown by its X-ray diffraction pattern. The shape imparted by the mold was stable and permanent and the article exhibited no plastic flow.

While the invention has been illustrated with respect to a particular composition containing a co-polymer of vinylidene chloride and vinyl chloride, it is to be understood that other proportions of these same co-polymerized ingredients may be used so long as the polymer conforms to the previously stated definition of crystalline polymers and that co-polymers other than the one of the example may be employed. Thus, the invention may be carried out in a similar manner and with like results while operating on the co-polymers of vinylidene chloride or other vinylidene halides and such co-polymerizable, unsaturated compounds as vinyl acetate, styrene, vinyl cyanide, methyl methacrylate, ethyl acrylate, chloro-allyl-chloro-acetate and the like, so long as the proportion of vinylidene halide and compound polymerized therewith is such as to form crystalline polymers as hereinbefore defined. The operations constituting the present invention are also applicable with results corresponding to those shown in the example to the crystalline polymeric forms of ethylene and its co-polymers.

The incorporation of minor amounts of plasticizers, coloring agents, fillers, heat-stabilizing agents and the like has also been found to be useful and desirable when used in such amounts that the crystallinity of the polymer is not affected.

This application is a coninuation-in-part of our prior application Serial 368,886, filed December 6, 1940.

We claim:
The method which comprises fusing a polymer selected from the group consisting of polymeric vinylidene chloride and its normally crystalline co-polymers, and injecting the fused mass into a mold maintained at a temperature in the range between 50° and about 110° C. to recrystallize substantially the polymer.

ROBERT C. REINHARDT.
ROBERT D. LOWRY.